United States Patent [19]

Sunano et al.

[11] Patent Number: 5,525,951
[45] Date of Patent: Jun. 11, 1996

[54] CHOKE COIL

[75] Inventors: Shuji Sunano, Hirakata; Yusuke Ikeda, Nara; Tsunetsugu Imanishi, Matsusaka; Tatsuo Maeoka, Kobe, all of Japan

[73] Assignee: Matsushita Electric Industrial Co., Ltd., Kadoma, Japan

[21] Appl. No.: 81,015

[22] Filed: Jun. 22, 1993

[30] Foreign Application Priority Data

Jun. 22, 1992 [JP] Japan ................................ 4-162473

[51] Int. Cl.$^6$ ............................ H01F 17/04; H01F 27/26
[52] U.S. Cl. ...................... 336/160; 336/178; 336/181; 336/212; 336/215
[58] Field of Search ............................ 336/212, 180, 336/160, 165, 178, 214, 215, 181, 184

[56] References Cited

U.S. PATENT DOCUMENTS

| 1,835,209 | 12/1931 | Dowling | 336/160 |
|---|---|---|---|
| 2,780,786 | 2/1957 | Johnson | 336/212 |
| 2,864,993 | 12/1958 | Sehober | 336/215 |
| 2,910,640 | 10/1959 | Blankonbuehler | 336/165 |
| 4,009,460 | 2/1977 | Fukui et al. | 336/215 |
| 4,910,482 | 3/1990 | Takagai et al. | 336/212 |
| 5,177,460 | 1/1993 | Dhyanehard et al. | 336/212 |
| 5,187,428 | 2/1993 | Hutchison et al. | 336/160 |

FOREIGN PATENT DOCUMENTS

| 2405689 | 8/1975 | Germany . | |
|---|---|---|---|
| 596128 | 7/1959 | Italy | 336/212 |
| 59-182514 | 10/1984 | Japan . | |
| 60-10606 | 1/1985 | Japan . | |
| 4-91412 | 3/1992 | Japan . | |
| WO89/07828 | 8/1989 | WIPO . | |

*Primary Examiner*—Thomas J. Kozma
*Attorney, Agent, or Firm*—Ratner & Prestia

[57] ABSTRACT

Two coils 3a, 3b are wound over adjacent portions of a first magnetic core having two closed magnetic circuits and a second magnetic core. The winding directions of the two coils are set so that the magnetomotive forces generated by both coils may cancel each other in the second magnetic core. The magnetic fluxes flowing in the first magnetic core decrease the higher harmonics of an input current of the power source circuit, while the magnetic fluxes flowing in the second magnetic core 2 decrease the noise between the line and the ground. That is, the choke coil performs the function of choke coil and the function of noise filter at the same time.

4 Claims, 7 Drawing Sheets

5,525,951

CHOKE COIL

BACKGROUND OF THE INVENTION

The invention relates to choke coil used in an electronic appliance. The input current of a capacitor input rectifying circuit used in the power source of an electronic appliance contains higher harmonics. If the current waveforms are poor, it adversely affects the other electronic appliances, and consumes the capacity of power device and power feed line uneconomically. Hence, it is desirable to decrease the higher harmonics. To decrease the higher harmonics, a choke coil is used.

FIG. 12 shows an example of choke coil. A choke coil 19 is composed of a magnetic core 17 having a closed magnetic circuit, and a coil 18 wound thereon.

FIG. 13 shows a power source circuit of an electronic appliance. It comprises a rectifying and smoothing block 7, noise filter blocks 22, 23 incorporating a common mode choke coil 21, and a choke coil 19. The noise filter blocks 22, 23 and choke coil 19 occupy nearly the same space. To downsize the power source circuit, therefore, the choke coil 19 and common mode choke coil 21 are desirably compact in size. This desire, however, does not coincide with a requirement that the choke coil 19 have a large inductance in order to decrease the higher harmonics of the input current.

The invention therefore presents a choke coil which functions to decrease the higher harmonics of the input current as well as filter the noise. A power source using the choke coil of the present invention does not include a noise filter, and, hence, is reduced in size.

SUMMARY OF THE INVENTION

The choke coil of the present invention perfroms both the function of normal mode choke coil and common mode choke coil.

An exemplary embodiment of a choke coil employing the present invention comprises first magnetic means having two closed magnetic circuits, second magnetic means, a first piled portion overlapping one of the closed magnetic circuits of the first magnetic means and a part of the second magnetic means, a second piled portion overlapping the other closed magnetic circuit of the first magnetic means and a other part of the second magnetic means, a first coil wound around the first piled portion, and a second coil wound around the second piled portion, wherein the winding directions of the both coils are set so that the magnetomotive forces generated by the both coils may cancel each other within the second magnetic means.

The first magnetic means and two coils compose the function of the normal mode choke coil necessary for decreasing the higher harmonics of the input current. The second magnetic means and two coils compose the function of common mode choke coil necessary for decreasing the noise between the power source line and the ground. The magnetic flux leaking from the second magnetic means to the first magnetic means composes a part of the function of the normal mode choke coil. When the choke coil of the invention is used in the choke coil 19 of the power source circuit in FIG. 13 mentioned above, since the choke coil of the invention possesses the function of common mode choke coil, the circuit can be composed without using noise filter blocks 22, 23, and the power source circuit is reduced in size. Of course, the cost is reduced, too.

DETAILED DESCRIPTION OF THE INVENTION (Embodiment)

Figure 1:
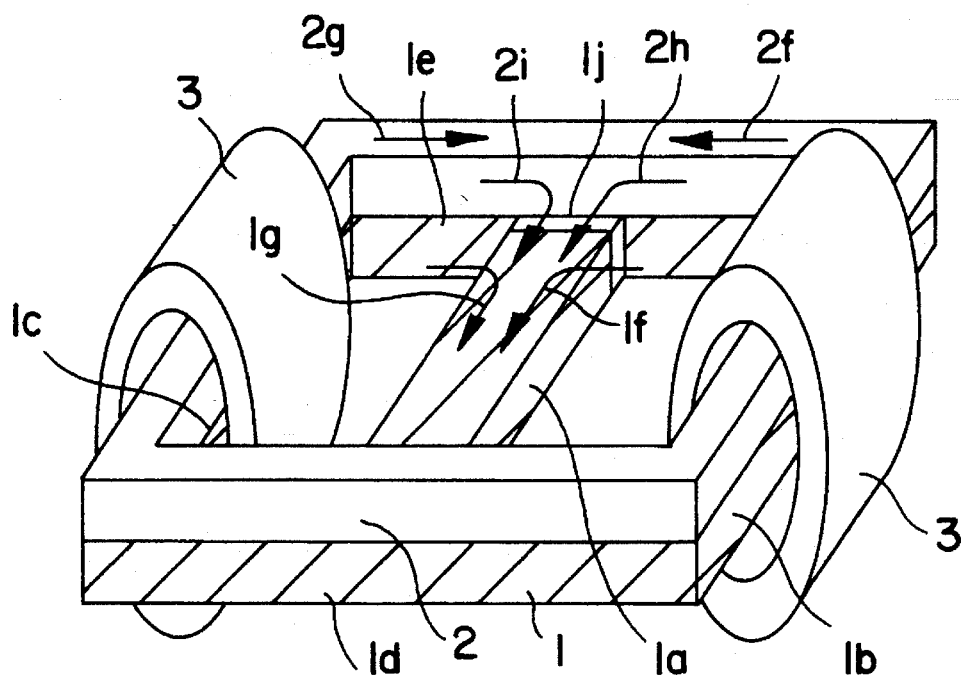
FIG. 1 is a perspective view of a first exemplary embodiment of the choke coil of the present invention.

FIG. 1 is a perspective view showing the first exemplary embodiment of a choke coil employing the present invention. The first magnetic means 1 includes two closed magnetic circuits by combination of E-shaped magnetic core and I-shaped magnetic core both made of silicon steel plates. The reference number 1j is a magnetic air gap for preventing magnetic saturation.

One of the closed magnetic circuits of the magnetic means 1 includes the right half of a common core leg 1e, right half of magnetic air gap 1j, right half of central core leg 1a, right half of common core leg 1d, and side core leg 1b.

The other closed magnetic circuit of the first magnetic means 1 includes the left half of common core leg 1e, left half of magnetic air gap 1j, left half of central core leg 1a, left half of common core leg 1d, and side core leg 1c.

The second magnetic means 2 is a square-shaped magnetic core which, in the exemplary embodiment, is made of ferrite, and which is laid over the first magnetic means 1 as shown in FIG. 1.

One coil 3a is wound around the side core leg 1b of the first magnetic means 1 and the second magnetic means 2 is laid thereover.

Another coil 3b is wound around the side core leg 1c of the first magnetic means 1 and the second magnetic means 2 is laid thereover.

In the exemplary embodiment, both coils 3a and 3b have the same number of turns. The winding directions of the two coils 3a and 3b are set so that the magnetomotive forces generated by the coils may cancel each other in the second magnetic means 2.

As the conductor of both coils 3a and 3b, in the exemplary embodiment, either copper wire or copper foil is used. The first magnetic means 1 and second magnetic means 2 are preferred to have the same dimensions in the overlayed portions so that the combined overlayed portions may be smooth and the shape of the coil bobbin covering them may be simple.

Figure 2:
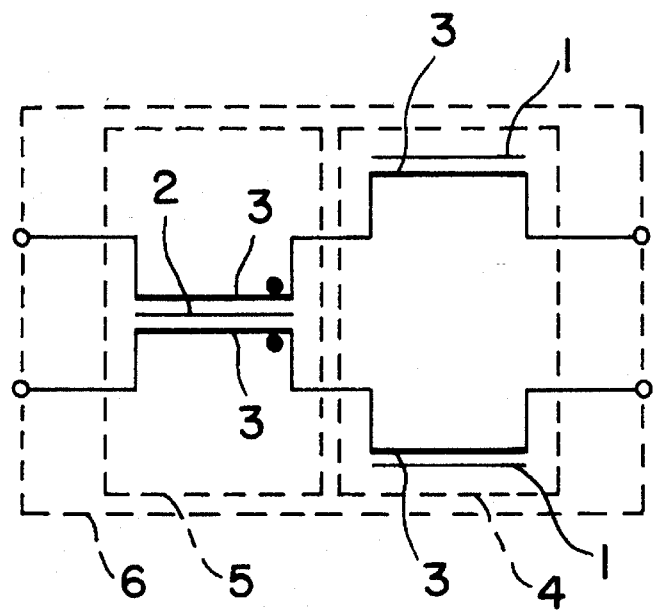
FIG. 2 is an equivalent circuit diagram of the choke coil of FIG. 1.

Magnetic fluxes indicated by arrows 1f, 1g are generated in the first magnetic means 1, and leakage magnetic fluxes indicated by arrows 2h, 2i are generated between the first magnetic means 1 and second magnetic means 2. The magnetic fluxes 1f, 1g, 2h, 2i make up a normal mode choke 4 shown in FIG. 2. The magnetic fluxes 2f, 2g generated in the second magnetic means 2 make up a common mode choke 5.

Figure 4:
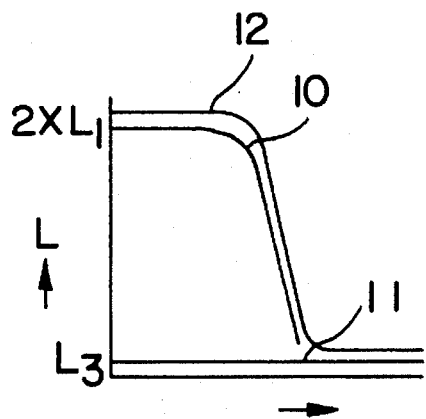
FIG. 4 is a frequency characteristic diagram of inductance in the normal mode of the choke coil shown in FIG. 1.

A curve 12 shown in FIG. 4 shows a frequency characteristic of the normal mode of the choke coil 6. The inductance decreases the higher harmonics of the input current. The magnetic fluxes 1f, 1g of the first magnetic means 1 produce an inductance 2L1 having the two coils 3a and 3b connected in series, and a curve 10 is obtained. The leakage magnetic fluxes 2h, 2i produce a leakage inductance L3, and a curve 11 is obtained. A curve 12 is obtained by combining curve 10 and curve 11.

The leakage inductance L3 is not attenuated even at high frequency, and the choke coil of the present invention therefore exhibits a normal mode inductance of more than 10 times larger at high frequency as compared with that of the conventional choke coil.

Figure 5:
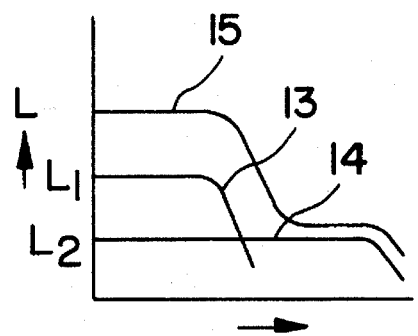
FIG. 5 is a frequency characteristic diagram of inductance in the common mode of the choke coil shown in FIG. 1.

A curve 15 in FIG. 5 shows a frequency characteristic of inductance of common mode of the choke coil 6. The magnetic fluxes 1f, 1g of the first magnetic means 1 make up an inductance L1 having two coils 3a and 3b connected in parallel, and a curve 13 is obtained. The magnetic fluxes 2f, 2g and leakage magnetic fluxes 2h, 2i of the second magnetic means 2 make up an inductance L2 having two coils 3a and 3b connected in parallel, and a curve 14 is obtained. A curve 15 obtained by combining the curve 13 and the curve 14.

In the exemplary embodiment, the two coils 3a and 3b are wound with a large number of turns in order to obtain a large normal mode inductance. Therefore, the inductance of the common mode shown by curve 15 is larger than that of a conventional common mode choke.

The frequency characteristic of the choke coil 6 shown in FIG. 4 and FIG. 5 may be changed, if necessary, by varying the magnetic characteristics of the first magnetic means 1 and second magnetic means 2. To vary the magnectic characteristics of the first magnetic means 1 and second magnetic means 2, a different magnetic material can be selected, or a magnetic material composed of more than one magnetic materials can be selected.

The first magnetic means 1 and second magnetic means 2 may be ring-shaped, as well as square-shaped. The location of magnetic air gap 1j in the first magnetic means 1 is not limited within the core leg 1a, but one or more locations may be selected over the entire first magnetic means 1.

Figure 3:
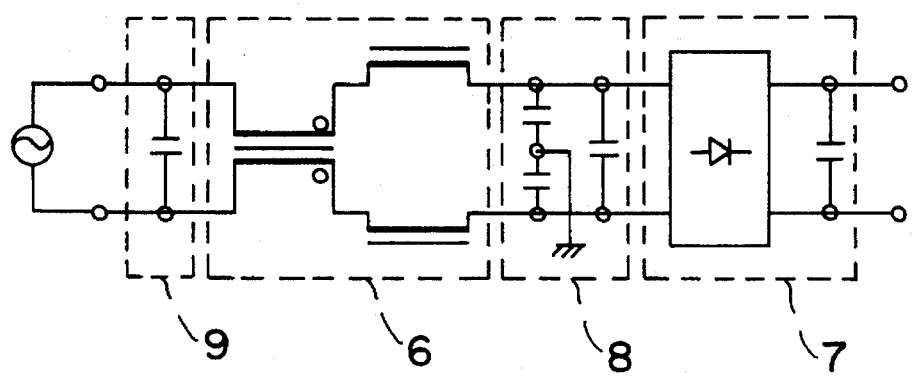
FIG. 3 is a circuit diagram using the choke coil of FIG. 2.

FIG. 3 shows a power source circuit using the choke coil 6 of the present invention. Numeral 7 is a rectifying and smoothing block. Reference numerals 8 and 9 are capacitors. The choke coil 6 prevents noise while simultaneously decreasing the higher harmonics of the input current. Therefore, the noise filter is not used.

(Embodiment 2)

Figure 6:
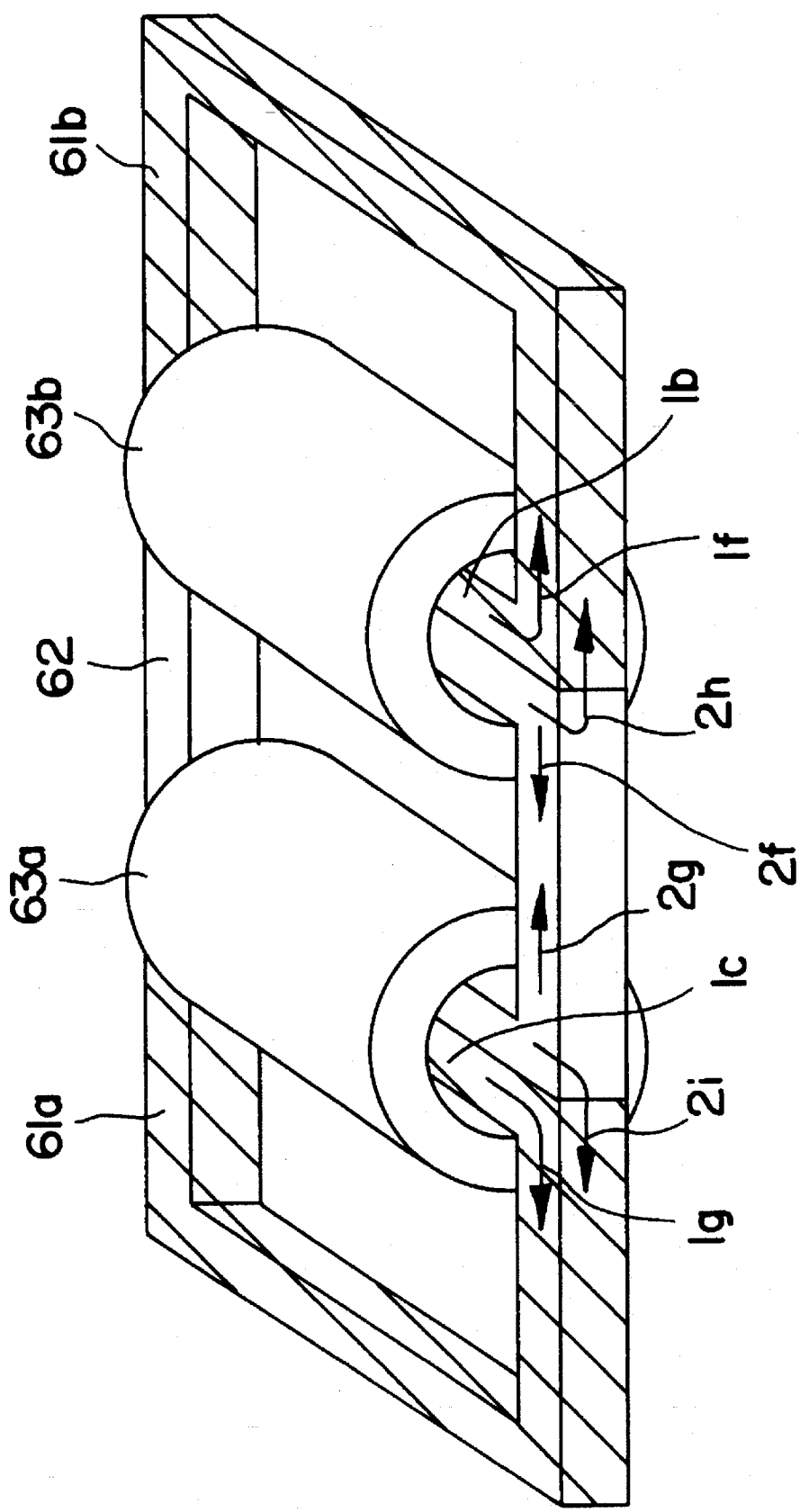
FIG. 6 is a perspective view of a second exemplary embodiment of a choke coil a second embodiment of the present invention.

FIG. 6 is a perspective view showing a choke coil in the second exemplary embodiment of the present invention. Two magnetic means 61a and b are overlaid in the horizontal direction on both sides of magnetic means 62. Around the adjacent portions of the magnetic means 61a and b and magnetic means 62, two coils 63a and b are wound. Both coils 63a and b have the same number of turns. The winding directions of the two coils 63a and b are so set that the magnetomotive forces generated by the both coils may cancel each other in the second magnetic means.

(Embodiment 3)

Figure 7:
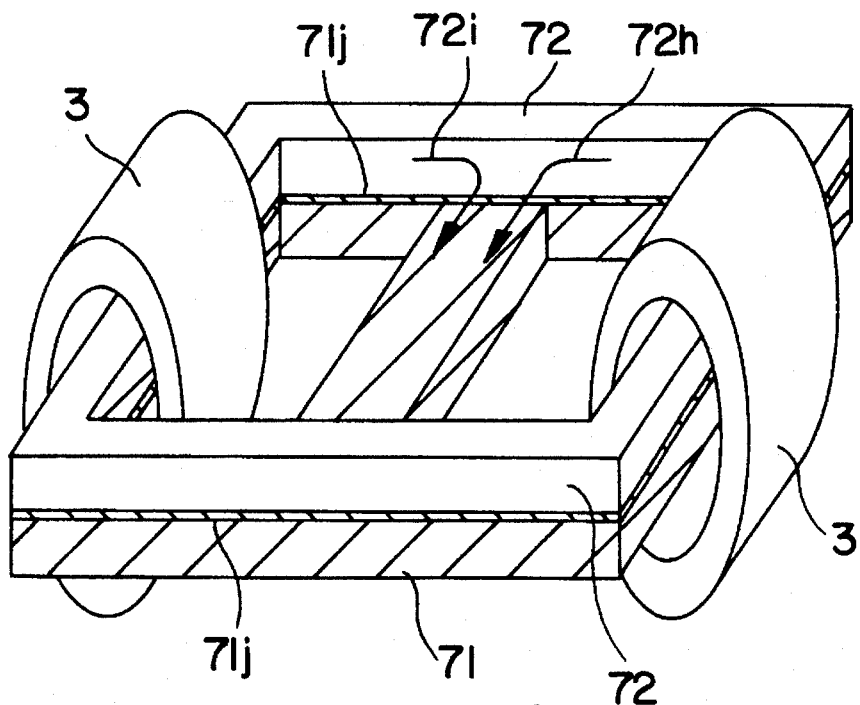
FIG. 7 is a perspective view of a third exemplary embodiment of a choke coil of the present invention.

FIG. 7 is a perspective view showing a choke coil in the third exemplary embodiment of the present invention. This embodiment is similar to Embodiment 1 except that a magnetic air gap 71j is present between the first magnetic means 71 and second magnetic means 72 by inserting a non-magnetic thin film. The presence of the magnetic air gap 71j decreases the leakage magnetic fluxes 72h, 72i, and the second magnetic means 72 is not magnetically saturated if a large current flows in the choke coil. However, decrease of leakage magnetic fluxes 72h, 72i brings about a disadvantage of decreasing the normal mode inductance. Yet, as mentioned above, the choke coil of the invention has a normal mode inductance of over ten times larger at high frequency as compared with that of a conventional choke coil. Therefore, a decrease of inductance is not significant.

(Embodiment 4)

Figure 8:
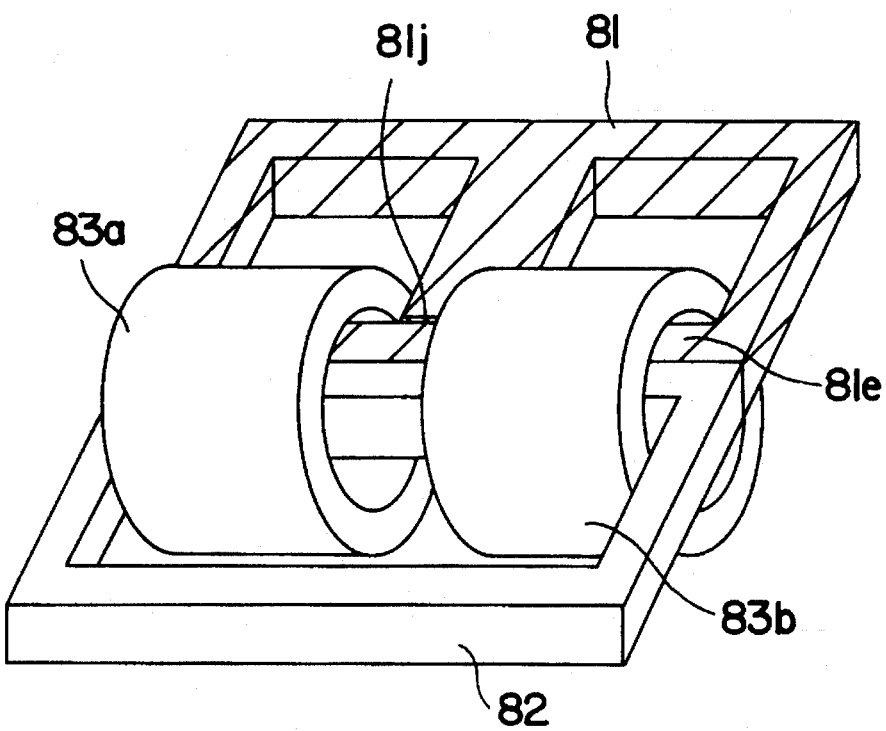
FIG. 8 is a perspective view of a fourth exemplary embodiment of a choke coil of the present invention.

FIG. 8 is a perspective view showing a choke coil in the fourth exemplary embodiment of the present invention. The first magnetic means 81 includes two closed magnetic circuits by combination of E-shaped magnetic core and I-shaped magnetic core both made of silicon steel plates. Reference numeral 81j is a magnetic air gap for preventing magnetic saturation. Second magnetic means 82 is a common square-shaped ferrite core, which is positioned adjacent to a common core leg 81e of the first magnetic means 1 in the horizontal direction. Around the adjacent portions of the first magnetic means 81 and second magnetic means 82, two coils 83a and b are wound. The both coils 83a and b have the same number of turns. The winding directions of the two coils 83a and b are set so that the magnetomotive forces generated in both coils may cancel each other in the second magnetic means 82. The two coils 83a and b are mounted on the common core leg 81e, and hence the distance between the two coils is short. Therefore, the magnetic fluxes in the opposite directions created by the two coils in the second magnetic means 82 cancel each other almost completely, and, as a result, if a large current flows in the choke coil, the second magnetic means 82 will not be saturated magnetically. This makes it possible to reduce the size of the second magnetic means 2.

(Embodiment 5)

Figure 9:
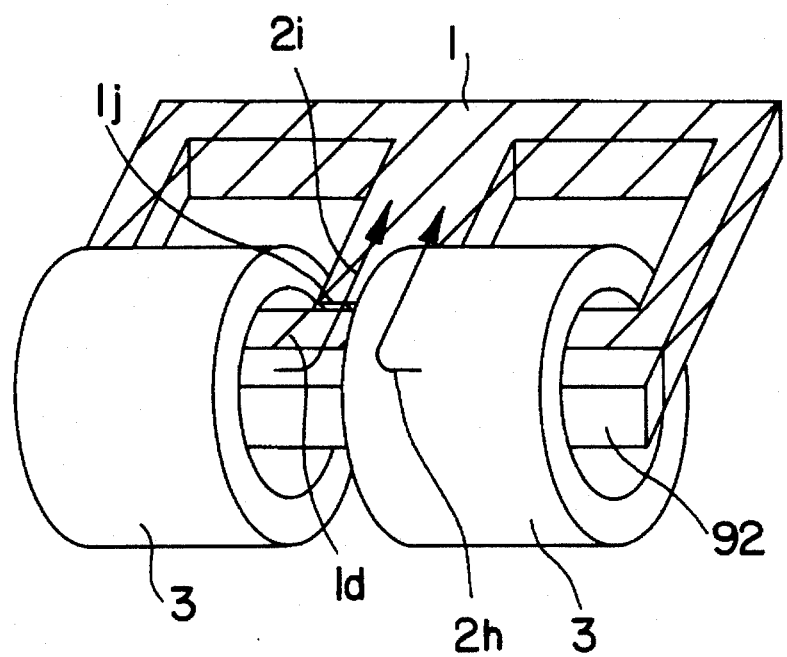
FIG. 9 is a perspective view of a fifth exemplary embodiment of a choke coil of the present invention.

FIG. 9 is a perspective view showing a choke coil in the fifth exemplary embodiment of the invention. Second magnetic means 92 is in a bar shape possessing an open magnetic circuit. The choke coil of this embodiment is small in size because the shape of the magnetic means 92 is small.

(Embodiment 6)

Figure 10:
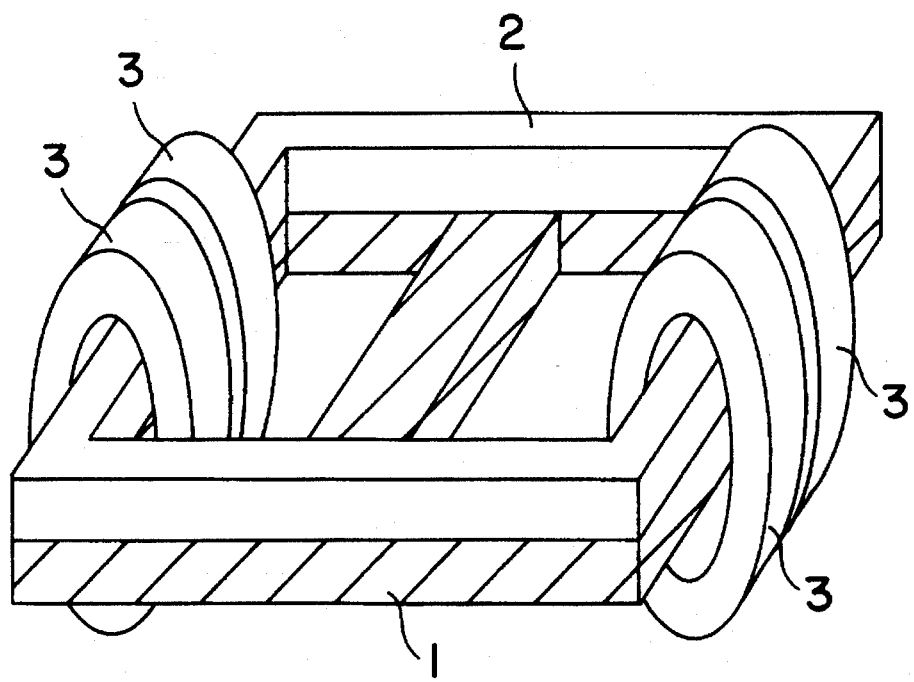
FIG. 10 is a perspective view of a sixth exemplary embodiment of a choke coil of the present invention.

FIG. 10 is a perspective view showing a choke coil in the sixth exemplary embodiment of the invention. Herein, the two coils 3 in FIG. 1 are divided into two coils each connected in series, and the floating capacity of each coil is decreased. The high frequency characteristic of the common mode choke coil is enhanced as the floating capacity of the coil decreases.

(Embodiment 7)

Figure 11:
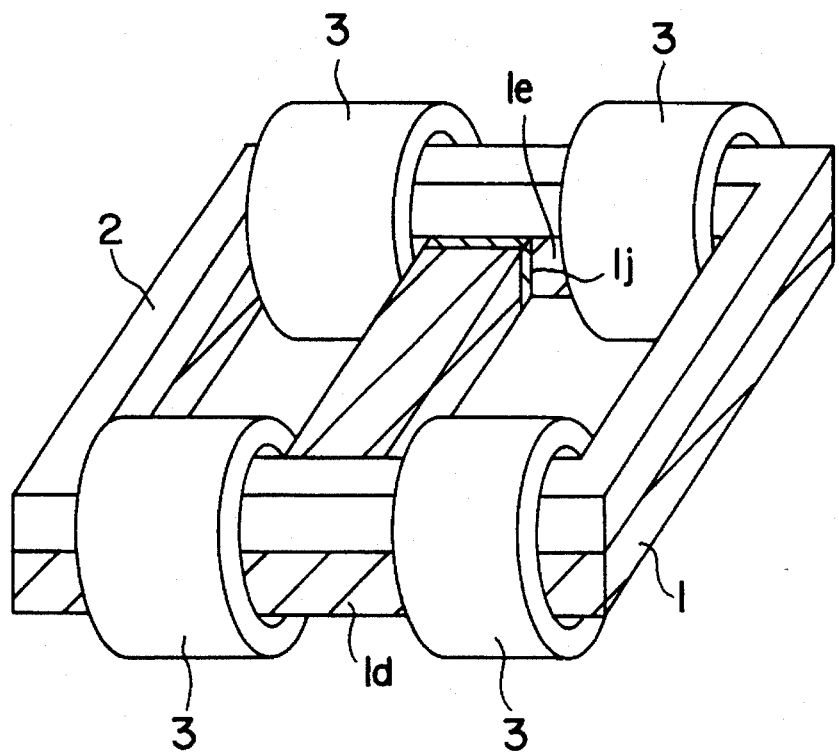
FIG. 11 is a perspective view of a seventh exemplary embodiment of a choke coil of the present invention.
Figure 12:
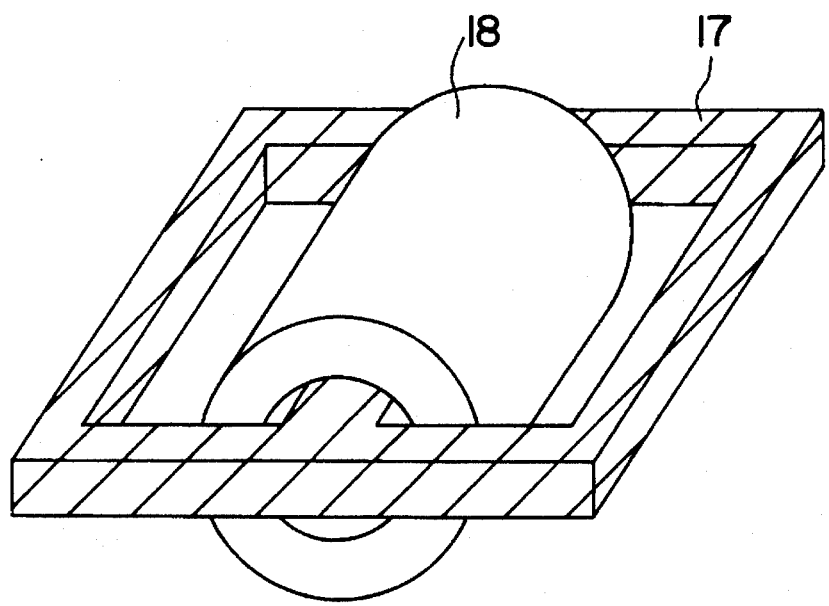
FIG. 12 is a perspective view of a conventional choke coil.
Figure 13:
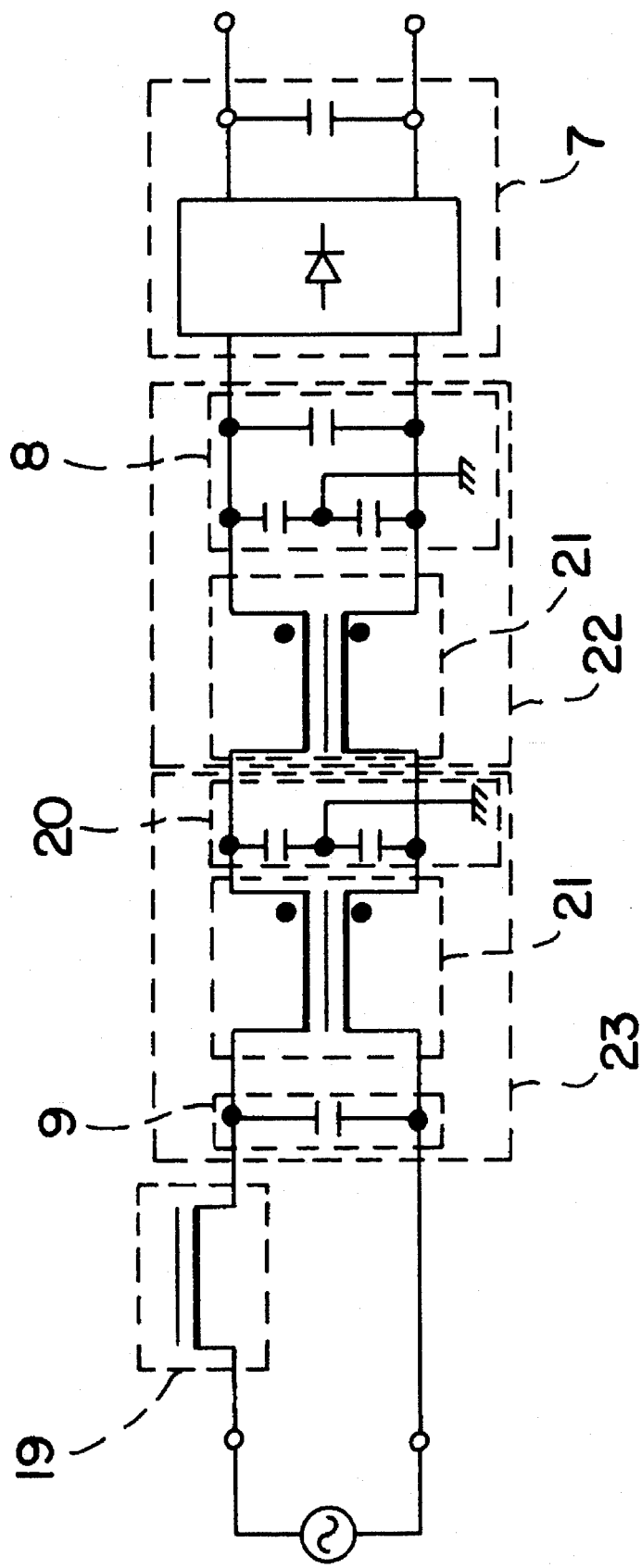
FIG. 13 is a circuit diagram using the conventional choke coil of FIG. 12.

FIG. 11 is a perspective view showing a choke coil in the seventh exemplary embodiment of the invention. Herein, the four coils in FIG. 10 are disposed on the common core leg. This embodiment realizes the effects of both Embodiment 4 and Embodiment 6 at the same time.

The invention may be embodied in other specific form without department from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A choke coil comprising:

first magnetic means, having a magnetic core having a first and a second outside portion and a middle portion located between a top and a bottom portion, for generating magnetic flux, second magnetic means, positioned adjacent to the first magnetic means, for generating magnetic flux, wherein the entire second magnetic means overlaps the first magnetic means, a first segment of the second magnetic means overlapping the first outside portion of the first magnetic means forming a first overlapping portion and a third segment of the second magnetic means overlapping the second outside portion of the first magnetic means forming a second overlapping portion, a first coil wound around said first overlapping portion, and a second coil wound around said second overlapping portion, wherein said first and second coils are wound so that magnetomotive forces generated by both coils substantially cancel each other within the second magnetic means.

2. A choke coil of claim 1, wherein the first magnetic means includes at least one magnetic air gap.

3. A choke coil of claim 1, wherein the first coil and the second coil each include a plurality of coils connected in series.

4. A choke coil of claim 1, wherein the first magnetic means and secon magnetic means have the same dimensions in the first and second overlapping portions.

* * * * *

UNITED STATES PATENT AND TRADE MARK OFFICE
CERTIFICATE OF CORRECTION

PATENT NO. : 5,525,951
DATED : June 11, 1996
INVENTOR(S) : Sunano et al.

It is certified that error appears in the above-identified patent and that said Letters Patent is hereby corrected as shown below:

Column 6, line 28, "secon" should be --second--.

Signed and Sealed this

Twenty-eighth Day of January, 1997

Attest:

BRUCE LEHMAN

Attesting Officer     Commissioner of Patents and Trademarks